May 21, 1940.  J. F. ANDERSON  2,201,877

MASKING TAPE

Filed Oct. 4, 1938

Plasticized gamma polyvinyl chloride
fabric
Adhesive rubber composition

Inventor
John F. Anderson
By Willis J. Young
Atty.

Patented May 21, 1940

2,201,877

UNITED STATES PATENT OFFICE 2,201,877

MASKING TAPE

John F. Anderson, Cuyahoga Falls, Ohio, assignor to The B. F. Goodrich Company, New York, N. Y., a corporation of New York Application October 4, 1938, Serial No. 233,251

3 Claims. (Cl. 91—65)

This invention relates to masking tape, and more particularly to a masking tape which has been treated to prevent creeping at the edges thereof.

Masking tape comprising a base of a fibrous nature and an adhesive face is commonly employed when it is desired to paint selected portions of an article without affecting other portions. It is practically essential to use masking tape when the point is to be selectively applied by a spraying process. It has been found, however, that whether a woven or unwoven base was used, the paint had a tendency to "creep" at the edges, thereby forming uneven boundaries instead of the sharp, distinct edges desired. It has been proposed to treat the back of the fibrous base of the masking tape with various materials such as rubber, cellulose esters, waxes, drying oils, etc., in order to prevent the creeping. These treatments have been unsatisfactory, however, because the solvents employed in the paints and lacquers often affected the coating, and the adhesion between the face and the back of rolled tape often made unwinding very difficult.

It is an object of this invention to provide masking tape which may be used to provide sharp, distinct divisions between painted and unpainted surfaces.

A further object is the provision of a masking tape which will not be adversely affected by oils, solvents, water, or other deteriorating materials to which masking tape is often exposed.

Another object is the provision of a masking tape which may be easily unwound from a roll.

A still further object is the provision of a masking tape with a treated back which does not adversely affect the adhesive surface when placed in contact therewith.

These objects are accomplished by applying on the back of a fibrous base material having an adhesive face, a layer of a plasticized gamma polyvinyl chloride composition, such as one of the compositions described in U. S. Patent No. 1,929,453 issued to Waldo L. Semon.

A preferred embodiment of the invention is illustrated in the accompanying drawing representing in section a woven fabric base having on its face a pressure-sensitive rubber adhesive layer and on its back a layer of plasticized gamma polyvinyl chloride.

The plasticized gamma polyvinyl chloride layer may be applied to back of the tape by any desired method. A composition containing gamma polyvinyl chloride 7.7 parts by weight, tricresyl phosphate 5.8 parts by weight, and mesityl oxide 86.5 parts by weight, for instance, may be spread at a temperature of about 140° F. with a doctor blade upon the back of a woven fabric base. In another embodiment, a composition consisting of gamma polyvinyl chloride 57 parts by weight and tricresyl phosphate 43 parts by weight is calendered upon the back of a paper base before the adhesive face is applied. If the plasticized gamma polyvinyl chloride backing is applied to the base in such a manner that it permeates the same, it is desirable to apply the rubber adhesive surface first, since rubber does not adhere to plasticized gamma polyvinyl chloride.

The plasticized gamma polyvinyl chloride composition may contain gas black, barytes, clay, zinc oxide, or other pigments and fillers commonly used in the rubber and plastics industries. It may also be found desirable to introduce into the compositions a stabilizer such as lead silicate, organic basic materials such as triethanolamine, or certain metallic soaps such as lead oleate, cadmium laurate, etc.

The fibrous base may be made of paper, or may consist of fabric woven from cotton, silk, hemp, or other fibrous material. A plain cotton weave fabric is employed in the preferred embodiment, though paper may be used when it is desired to make a masking tape which may be easily torn into sections.

The adhesive face is usually a pressure-sensitive rubber adhesive, the term "rubber" being employed to include latex, although other adhesive materials such as glue may be less preferably employed.

While the products of this invention are primarily useful as masking tape, they may be also used as adhesive tape, surgical plasters, friction tape in electrical work, tape for bookbinding, or for any other purpose for which a material having the properties possessed by the products of this invention is desired.

Although I have herein disclosed a specific embodiment of my invention, I do not intend to limit my self wholly thereto, for it will be obvious to those skilled in the art that many modifications are within the spirit and scope of the invention as defined in the appended claims.

I claim:

1. Masking tape comprising a woven fibrous base having on its face a pressure-sensitive rubber adhesive composition and on its back plasticized gamma polyvinyl chloride.

2. Masking tape comprising a woven fibrous base having on its base an adhesive composition and on its back plasticized gamma polyvinyl chloride.

3. Masking tape comprising a base of woven cotton fabric having on its face a pressure-sensitive adhesive composition and on its back plasticized gamma polyvinyl chloride.

JOHN F. ANDERSON.